Nov. 18, 1941.  L. E. WHITE  2,263,431
TRIMMER
Filed June 8, 1939  2 Sheets-Sheet 1

Inventor:
Leslie E. White
By Dike, Calvin + Gray
Attorneys

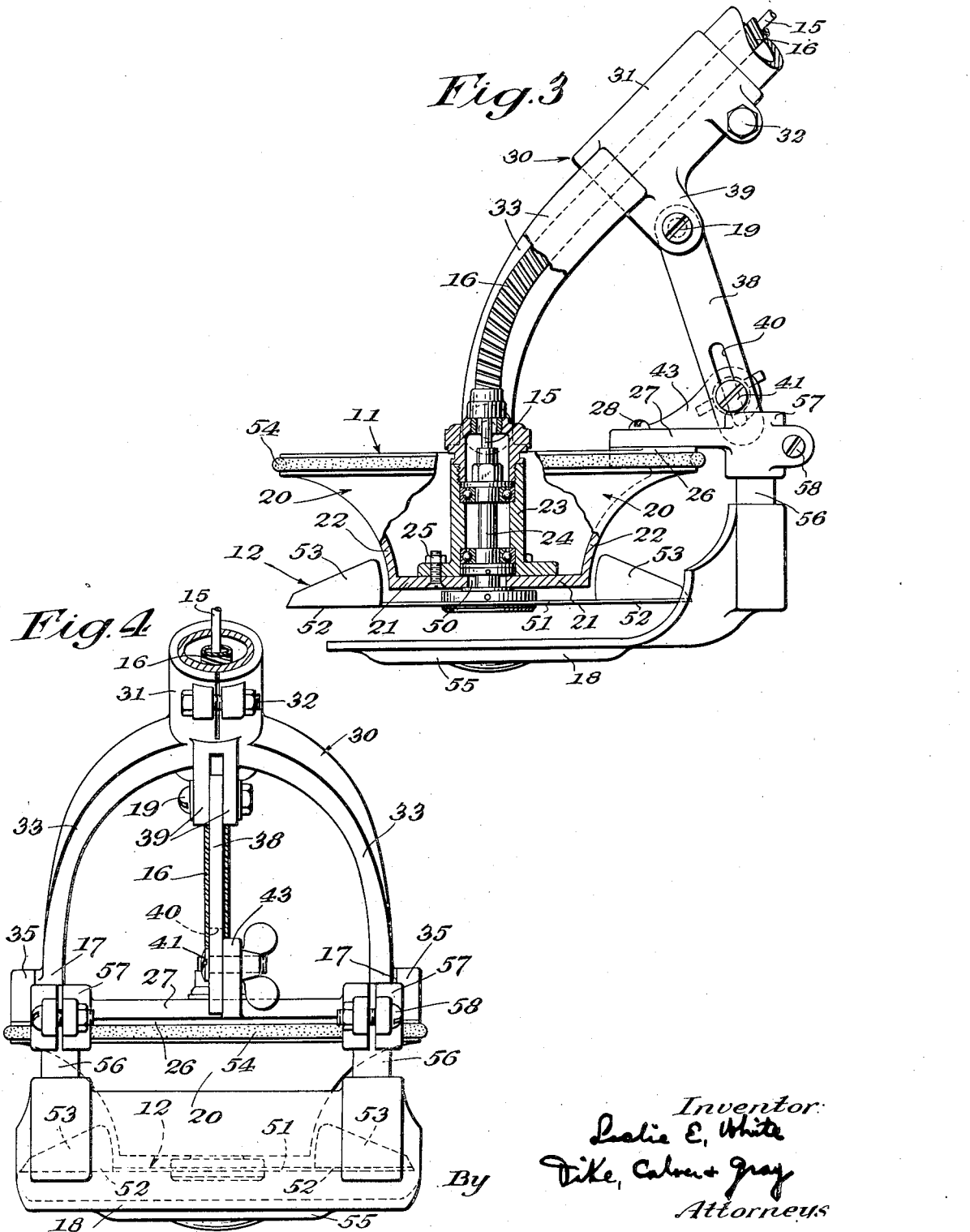

Patented Nov. 18, 1941

2,263,431

UNITED STATES PATENT OFFICE 2,263,431

TRIMMER

Leslie E. White, Boston, Mass.

Application June 8, 1939, Serial No. 278,049

4 Claims. (Cl. 56—25)

This invention relates to device for cutting or trimming grass, foliage or the like, and more particularly to a power driven device for this purpose which may be supported and moved bodily by the operator over the surface to be cut as distinguished from the carriage type of cutter which is supported upon wheels while being moved over the surface to be cut.

Devices of this general character prior to the present invention have been so constructed that they were difficult to manipulate and their use quickly tired the workmen. In such prior devices the cutting means and the electric driving motor were both mounted at the lower end of the manipulating handle. Consequently, in use, the operator not only had to carry the dead weight of both these instrumentalities but he had to counteract the force due to this dead weight acting upon a lever arm of considerable length. Furthermore, when the devices were used for trimming damp grass or the like, the driving motor was subjected directly to any water spray produced by the rapid rotation of the cutter in the damp grass and also damp cut grass was thrown thereupon causing injury and quick deterioration of the motor.

In accordance with the present invention, a device is provided in which the cutting means and the driving means therefor are arranged so as substantially to counter-balance one another. More specifically, the invention contemplates a cutter head arranged to create suction to draw the material being cut into the path of the cutting means and also to deflect the cut material away from the device.

These and other features of the invention will be more clearly understood from the following description in conjunction with the accompanying drawings: in which, Fig. 1 is a side elevational view of the device embodying the invention;

Fig. 3 is an elevational view, partly in section, of the portion of the device shown in Fig. 2; and Fig. 4 is a rear elevational view of the portion of the device shown in Figs. 2 and 3.

Figure 1:
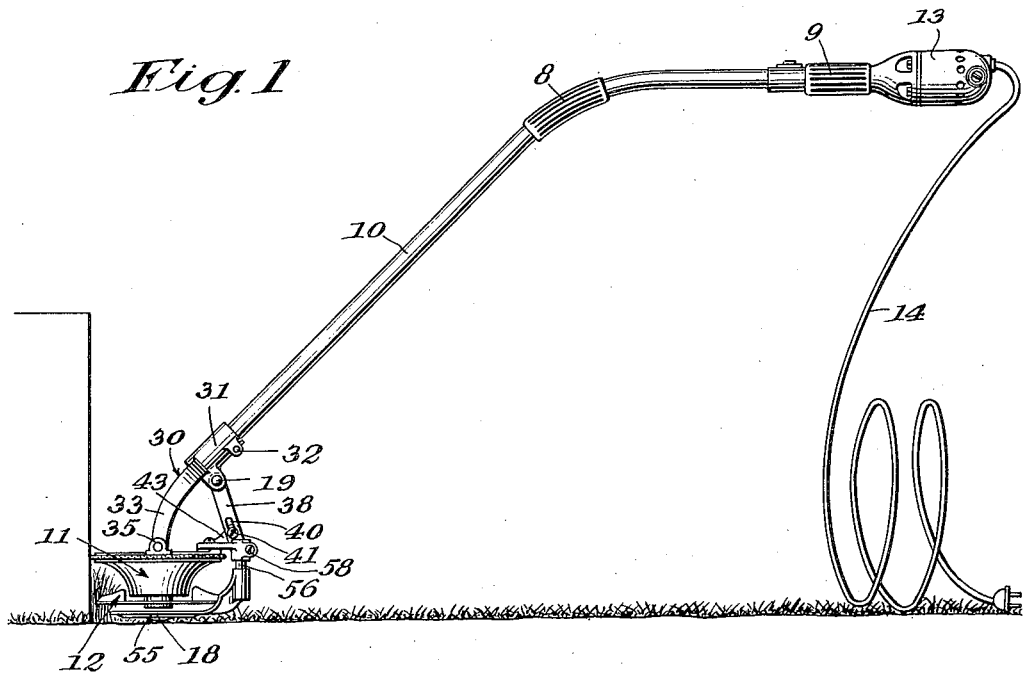
Figure 2:
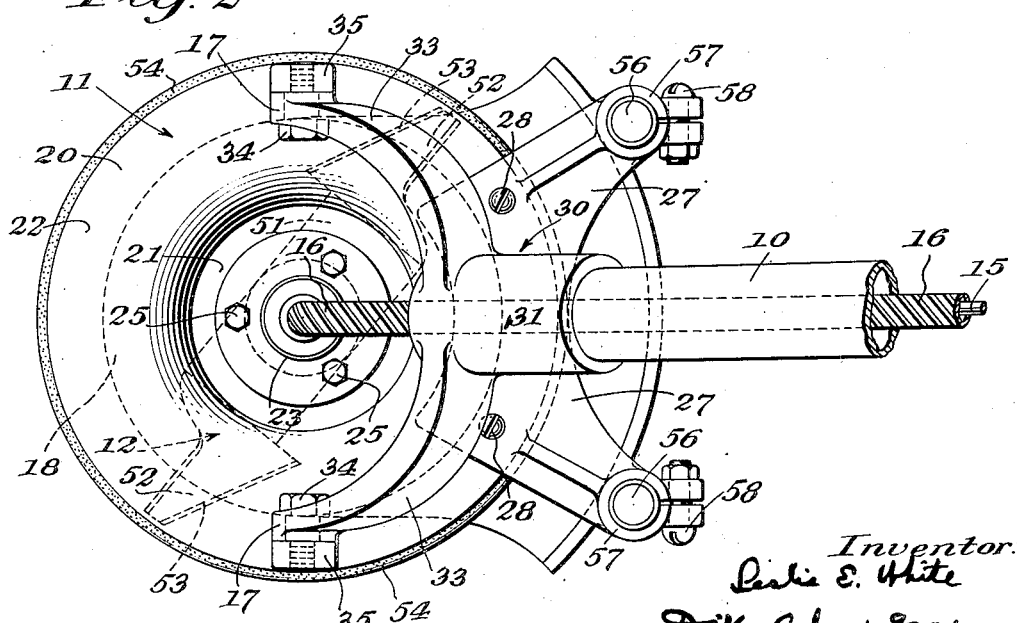
Fig. 2 is a plan view of the lower end portion of the device.

The illustrative embodiment of the invention illustrated in the accompanying drawings comprises a lever-like frame or manipulating handle 10 which, as illustrated, is a hollow metal tube bent substantially to the form shown. If desired, the handle 10 may be provided with hand grips 8 and 9 of rubber or other suitable material. The position of the grip 8 may be adjusted along the tube 10 to suit the desire of the particular operator. A cutter head 11 is mounted upon the lower end of the member 10 and comprises a cup-shaped member 20 positioned above a rotatable cutter 12 and a guide plate 18 positioned below the cutter. Driving means for the cutter 12, such as an electric motor 13, is mounted upon the other end of the member 10 and is supplied with electric power from any suitable source through the conduit 14. The cup-shaped member 20 has a flat bottom 21 and side walls 22 which curve upwardly and outwardly from the bottom beyond the path of movement of the cutter 12. A ball bearing housing 23 for the shaft 24 of the cutter 12 rests upon the inner surface of the bottom 21 and is secured thereto by bolts 25. A flexible drive shaft 15, extending through the flexible housing 16, is connected at one end to the cutter shaft 24 and is rotated through suitable connections between its other end and the motor 13.

The cup-shaped member 20 is secured to the frame 10 by a bracket 30 having a split clamp 31 secured to the lower end of the frame 10 by a clamping bolt 32. A pair of forked arms 33 extend outwardly and downwardly from the clamp 31 and each is provided at its lower end with a bearing 17. The bracket 30 is pivotally connected to the cup 20 by a pair of bolts 34 which pass through the bearings 17 and are secured to a pair of lugs 35 projecting upwardly at diametrically opposite points from the rim of the cup 20. The rear portion of the cup 20 is provided with a projection 26 extending inwardly from the rim and providing a platform for receiving a plate 27 which is secured thereto by screws 28. One end of a link 38 is positioned between a pair of ears 39 projecting from the clamp 31 and is pivotally secured thereto by a bolt 19. The other end of the link 38 is adjustably secured to an ear 43 projecting upwardly from the plate 27 by a clamping bolt 41 passing through the ear 43 and an elongated slot 40 in the link 38.

The cutter shaft 24 extends downward through the ball bearing housing 23 and through an opening 50 in the bottom 21 of the cup 20. The cutter 12 is secured to the lower end of the shaft 24 and comprises an arm 51 provided at each of its opposite ends with a cutter blade 52. The back portion of each blade 52 is turned upward to provide a baffle 53 which is inclined so as to create a suction when the cutter is rotated to draw grass or other material being cut into the path of movement of the blades 52. The curved side walls 22 of the cup 20 start to curve upward and outward from just inside the path of movement of the baffles 53 and curve upward and outward to a point beyond the path of movement of the outer tip of the blades 52. The air stream produced by the suction created moves upward past the blades 52 and baffles 53 and is deflected outward by the curved side walls 22 and carries cut material away from the device. The cup 20 is provided with an external annular groove adjacent its rim to receive a resilient rubber ring 54 which extends outward beyond the path of the cutter and serves as a stop preventing the cutter engaging abutments around which trimming is being done.

The guide plate 18 serves to limit the minimum height of cut when the device is used for trimming grass and is provided with a slightly rounded bottom 55 which may engage the ground. The rear portion of the plate 18 is curved upward and provided with a pair of spaced posts 56 adapted to be received in split clamps 57 carried by the plate 27. The posts 56 are secured in desired adjusted position by clamping bolts 58.

In use, the operator grasps the grips 8 and 9 and moves the device bodily over the surface to be trimmed with the guide plate 18 barely engaging the ground. Due to the fact that the cutter head 11 and motor 13 are supported at opposite ends of the manipulating frame 10, the position of the grip 8 may be adjusted so that the forces acting upon the lever-like frame 10 substantially are balanced and the device may be used for a long period at a time without tiring the operator. The desired angular position of the cutter head 11 with relation to the manipulating frame 10 to suit each operator may be obtained by adjusting the position of the clamping screw 41 in the slot 40 in the link 38. Likewise, the distance between the guide plate 18 and the cutter 12 may be adjusted to gauge the height of cut by adjusting the position of the posts 56 in the clamps 57. The suction created by the baffles 53 pulls bent-over grass into the path of the cutter 12 and assures a good appearance of the trimmed surface. The curved deflector walls 22 direct the air stream produced by the suction outwardly and forces the cut material away from the device.

I claim:

1. In a cutter head for a trimming device, a support, a shaft mounted for rotation in said support, a cutter mounted on said shaft and operative in a zone concentric with and spaced from said shaft and lying in a plane perpendicular to said shaft, a deflector secured to said support and having an effective annular deflecting surface concentric with and spaced from said shaft, the inner boundary of said zone being spaced a greater distance from said shaft than the inner boundary of said surface, the outer boundary of said surface being spaced a greater distance from said shaft than the inner boundary of said zone and being spaced a greater distance from said plane than the inner boundary of said surface, means adapted to cooperate with said surface for causing an air stream to flow inward toward said head and then through said zone toward said surface and finally outward away from said head whereby material to be trimmed is drawn into said zone and the trimmings cut from said material are carried outward.

2. In a cutter head for a trimming device, a support, a shaft mounted for rotation in said support, a cutter mounted on said shaft and operative in a zone concentric with and spaced from said shaft and lying in a plane perpendicular to said shaft, a deflector secured to said support and having an effective annular deflecting surface concentric with and spaced from said shaft, the inner boundary of said zone and the outer boundary of said surface being spaced greater distances from said shaft than the inner boundary of said surface and the outer boundary of said zone respectively, the outer boundary of said surface being farther from said plane than the inner boundary of said surface, means adapted to cooperate with said surface for causing an air stream to flow inward toward said head and then through said zone toward said surface and finally outward away from said head whereby material to be trimmed is drawn into said zone and the trimmings cut from said material are carried outward.

3. In a cutter head for a trimming device, a support, a shaft mounted for rotation in said support, a cutter mounted on said shaft and operative in a zone concentric with and spaced from said shaft and lying in a plane perpendicular to said shaft, a deflector secured to said support and having an effective annular deflecting surface concentric with and spaced from said shaft, the inner boundary of said zone being spaced a greater distance from said shaft than the inner boundary of said surface, the outer boundary of said surface being spaced a greater distance from said shaft than the inner boundary of said zone and being spaced a greater distance from said plane than the inner boundary of said surface, means adapted to cooperate with said surface for causing an air stream to flow inward toward said head and then through said zone toward said surface and finally outward away from said head whereby material to be trimmed is drawn into said zone and the trimmings cut from said material are carried outward, said means including a plate spaced axially of said shaft from the inner boundary of said surface a greater distance than said plane and in the same direction therefrom, the outer edge of said plate defining the inner boundary of said zone.

4. In a cutter head for a trimming device, a support, a shaft mounted for rotation in said support, a cutter mounted on said shaft and operative in a zone concentric with and spaced from said shaft and lying in a plane perpendicular to said shaft, a deflector secured to said support and having an effective annular deflecting surface concentric with and spaced from said shaft, the inner boundary of said zone and the outer boundary of said surface being spaced greater distances from said shaft than the inner boundary of said surface and the outer boundary of said zone respectively, the outer boundary of said surface being farther from said plane than the inner boundary of said surface, means adapted to cooperate with said surface for causing an air stream to flow inward toward said head and finally outward away from said head whereby material to be trimmed is drawn into said zone and the trimmings cut from said material are carried outward, said means including a plate spaced axially of said shaft from the inner boundary of said surface a greater distance than said plane and in the same direction therefrom, the outer edge of said plate defining the inner boundary of said zone.

LESLIE E. WHITE.